June 7, 1966 L. G. EHMANN 3,254,383
SELF-SWAGING FERRULE

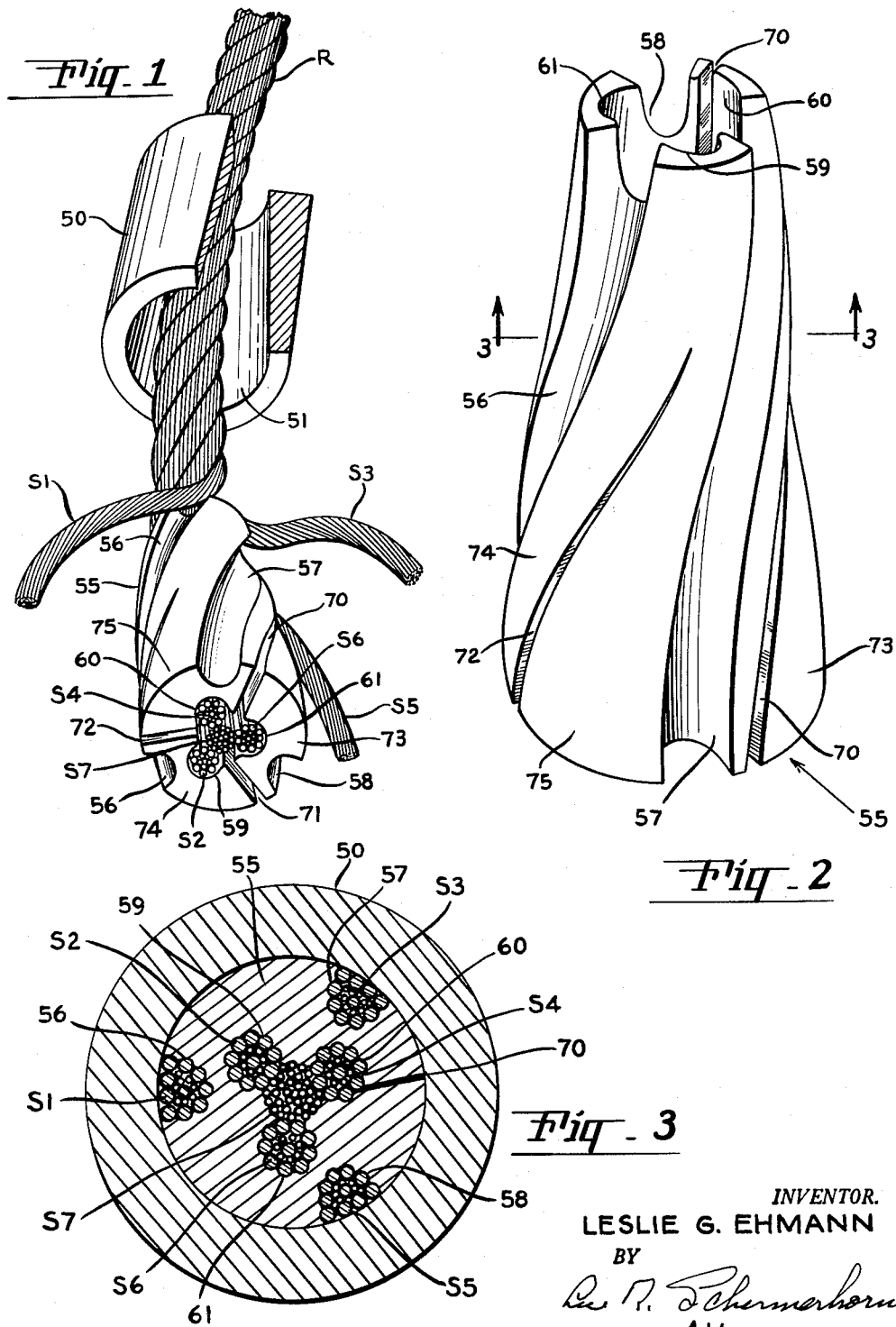

Filed Dec. 28, 1964 2 Sheets-Sheet 2

INVENTOR.
LESLIE G. EHMANN
BY
*signature*
Attorney

United States Patent Office 3,254,383
Patented June 7, 1966

3,254,383
SELF-SWAGING FERRULE
Leslie G. Ehmann, Portland, Oreg., assignor to Esco Corporation, Portland, Oreg., a corporation of Oregon
Filed Dec. 28, 1964, Ser. No. 421,500
10 Claims. (Cl. 24—122.6)

This invention relates to an improved ferrule for a wire rope.

Most wire rope ferrules heretofore proposed with frictional wedge blocks have proved unsatisfactory for various reasons. Most of them do not develop the full strength of the cable. When the wedge blocks and the ferrule sleeve are relatively rigid and unyielding, the wedge blocks do not come into sufficiently intimate gripping relationship with all of the strands of the cable and the individual wires in each strand, which are also relatively hard and unyielding. The clamping pressure tends to be concentrated more at certain points than others, causing some of the wires to be damaged and weakened. Wedge blocks which hold the wires in straight untwisted positions tend to over-stress the strands by placing relatively sharp bends at the transition points where their directions change abruptly from the spiral lay of the cable. Some of these difficulties are corrected by using a plurality of wedge blocks having spiral grooves but the proper placement of a plurality of wedge blocks is difficult to accomplish in the field when the ropes are large and the strands relatively stiff. A single wedge block which fits the lay of the strands is desirable.

The general object of the present invention is, therefore, to provide a ferrule having an improved wedge block which overcomes the disadvantages of the prior devices. Other objects are to provide a relatively small and compact ferrule which will develop the full strength of the rope, to provide a ferrule having a self-swaging action equivalent to that produced by a large and powerful swaging press, to provide a self-swaging ferrule with a one piece spiral wedge block and to provide a self-swaging wedge block which is easy to apply to large cables in the field without special tools.

The present ferrule consists of only two parts. One part is a steel sleeve having a smooth conical bore in which the cable strands and the wedge block may slide. The other part is a one piece, spiral grooved wedge block of a metal which has adequate strength but is somewhat softer than the metal of the sleeve and the metal of the wires of the strands so that under sufficient rope tension the wedge block is deformable and self-swaging into intimate contact with the wires of each strand of the cable. The wedge metal cold flows into a solid mass around the strands substantially closing all voids and developing the full breaking strength of the rope.

The wedge block is of split, segmented construction with special configuration allowing it to adjust to the strands of the cable in the manner of a plurality of separate blocks, although only a single block has to be handled and fitted in place in the sleeve in assembling the two parts on a cable. This greatly facilitates assembly on a large cable having stiff strands. Preferably, the wedge block contains a plurality of longitudinally extending spiral slits, at least one of which may extend the full length of the wedge block. This allows the connected segments to adjust themselves to the strands and contract circumferentially and radially before cold flow starts in the initial tensioning of the rope.

The foregoing and other objects and advantages will become apparent and the invention will be better understood from the following description of the two embodiments illustrated in the accompanying drawings. Various changes may be made, however, in the details of construction and arrangement of parts and certain features may be used without others. All such modifications within the scope of the appended claims are included in the invention.

In the drawings:

FIGURE 1 is a perspective view of a first embodiment showing the manner of applying the ferrule of the invention to a rope, a portion of the ferrule sleeve being broken away;

FIGURE 2 is a perspective view of the wedge block in FIGURE 1;

FIGURE 3 is a cross sectional view at the line 3—3 in FIGURE 2, showing the ferrule on a rope;

Figure 4:
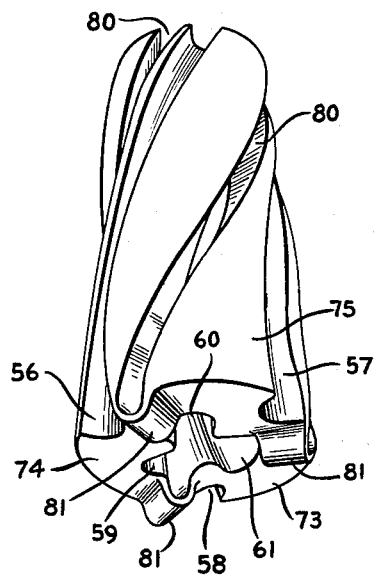
FIGURE 4 is a perspective view of the large end of a second embodiment of wedge block.

The sleeve 50 in FIGURE 1 has a tapered bore defined by a smooth conical interior wall 51. The sleeve is made of a relatively hard and strong material such as steel and of sufficient wall thickness that it will not yield or distort appreciably under working tension. The sleeve may be made integral with a clevis or other device for connection with an anchor point, mechanism or other cable, if desired.

The rope R in the present illustration is of conventional construction having six strands $S_1$ to $S_6$ twisted about a central strand $S_7$. Each strand is composed of a considerable number of steel wires W. The invention is not limited to a seven strand rope or cable, however.

The core member or wedge block 55 has three generally helical grooves 56, 57 and 58 on its outer conical surface for the strands $S_1$, $S_3$ and $S_5$. The wedge block has a hollow center containing three helical grooves 59, 60 and 61 to receive the three strands $S_2$, $S_4$ and $S_6$. This leaves sufficient space in the center for the center strand $S_7$.

In assembling the wedge block on the rope, the end of the rope is first passed through the small end of the sleeve. Then the alternate outer strands $S_1$, $S_3$ and $S_5$ are spread apart as shown in FIGURE 1 so that the core block may be screwed onto the remaining strands $S_2$, $S_4$ and $S_6$ which have not been separated from the center strand $S_7$. In this operation, the mating strands and interior grooves cooperate as screw threads, the grooves having the same pitch as the undisturbed strands so that the grooves fit the strands as though molded thereto, without changing the positions of the strands.

Similarly, the outer grooves 56, 57 and 58 follow the natural lay of the strands $S_1$, $S_3$ and $S_5$. When these strands are separated from the strands $S_2$, $S_4$ and $S_6$, they become displaced circumferentially from their original positions between strands $S_2$, $S_4$ and $S_6$. Their helical pitch increases until they naturally assume almost axial directions at the large end of the wedge block. The grooves 56, 57 and 58 follow these natural positions of the strands the same as if they were molded to the strands in spread apart positions. Thus, both the undisturbed and the spread apart strands lie in their natural positions in the assembled ferrule without being straightened out or bent and without being kinked at their transition into the rope at the small end of the wedge block. When all the strands have thus been laid into the grooves of the wedge block, the sleeve is driven over the assembly, the smooth conical bore 51 sliding on the surfaces of the outer strands and the outer surfaces of the wedge block until a tight fit is produced.

The wedge block in FIGURES 1 to 3 has a plurality of longitudinal, radially directed spiral slits to provide clamping resilience and allow it to contract in circumference without changing the relative positions of the strands in a circumferential direction. Thus, there is a longitudinal spiral slit 70 extending throughout its entire length and two shorter spiral slits 71 and 72, preferably extending from the large end halfway, or a little more than halfway, to the small end of the wedge block. These slits are disposed between the outer grooves 56, 57 and 58 without crossing any of the grooves. At their inner ends the slits open between the inner grooves 59, 60 and 61. The three slits form three sectors 73, 74 and 75 all connected together at the small end of the wedge block and each containing one outer groove and one inner groove for the strands.

When the sleeve is driven onto the wedge block, the wedge block is compressed circumferentially causing the slits to close or substantially close. This arrangement provides resilience in the wedge block for firmly clamping the strands in the ferrule and holding the parts securely in assembled relation prior to swaging. Swaging is accomplished by merely tensioning the cable from the ferrule. As the tension is increased, the walls of the slits close tightly together forming a solid wedge block which cannot yield further without deformation. The tensioning is then still further increased, causing the wedge block to deform sufficiently to flow around the individual wires of each strand so that portions of the wedge block have intimate bearing contact with substantially every individual wire in each strand of the cable as shown in FIGURE 3. The wedge block is of sufficient length that the spiral lay of the wires brings almost every wire into contact with the wedge block somewhere along its length even though the wires of the outer strands also engage the non-deformable sleeve at other points along the length of the assembly.

The inner strands $S_2$, $S_4$ and $S_6$ are largely individually enveloped by the wedge block and portions of the wedge block between the inner grooves 59, 60 and 61 also engage and flow between most of the wires of the center strand $S_7$. The wedge block flows into all voids, completely filling all the space in the sleeve which is not occupied by the strands themselves. The wedge block is preferably made of a suitable alloy which lends itself to easy cold flowing. The composition may vary in accordance with the hardness of the wires of the strands so as to flow in the manner described and at the same time develop sufficient strength to prevent the strands from pulling out of the sleeve.

Since this swaging action is accomplished entirely by rope tension, no swaging tools are required and the machinery associated with the cables provides means available in the field for swaging ferrules on the largest cables without any special equipment. The ferrule is much more compact and lighter in weight than conventional unswaged clamping devices commonly used on large cables or ropes.

Figure 5:
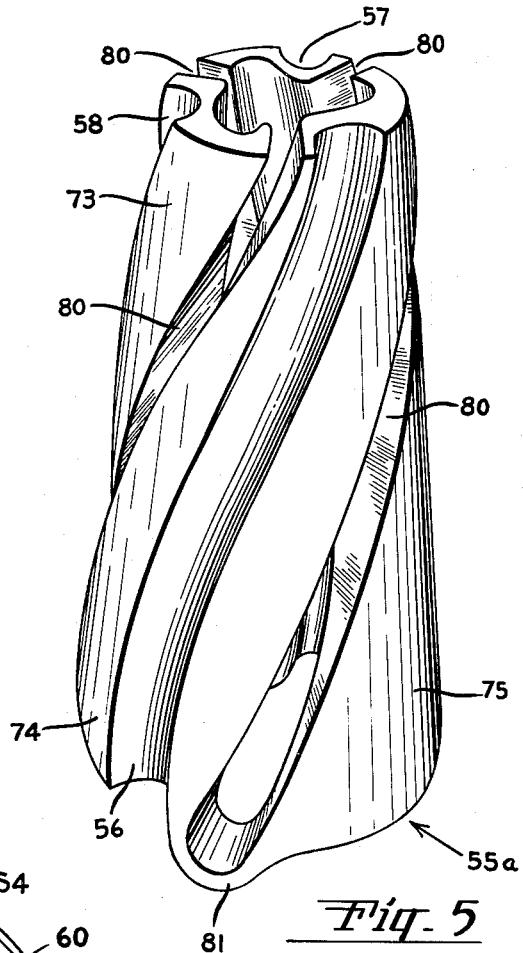
FIGURE 5 is an enlarged perspective view of the small end of the wedge block in FIGURE 4.
Figure 6:
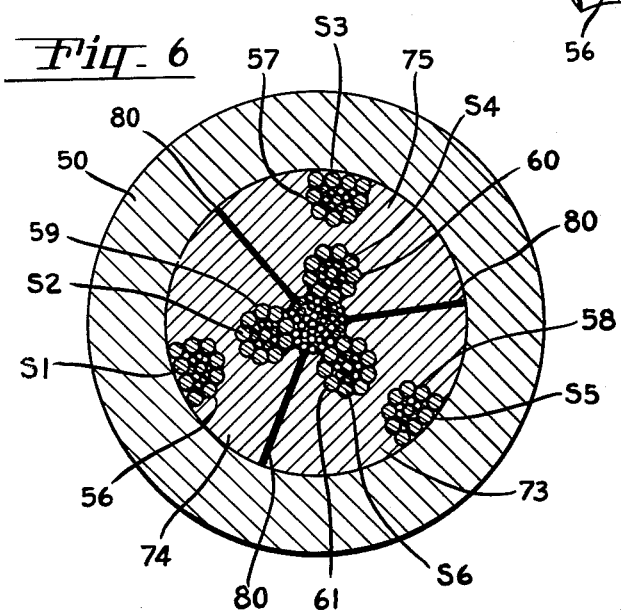
FIGURE 6 is a cross sectional view similar to FIGURE 3, showing the second embodiment.

In the embodiment shown in FIGURES 4 to 6, the three sectors 73, 74 and 75 are separated by three full length spiral slits 80. The slits 80 are spiraled to avoid crossing the inner and outer strand grooves as in the first embodiment. The three sectors are held together by three bridging webs 81, preferably at the large end of the wedge block. These bridging webs bow out in an axial direction so that they are readily deformable when the wedge block is forced into sleeve 50. The gaps in the slits 80 then close together and, with sufficient rope tension, cold flow occurs to produce self-swaging as described in connection with FIGURES 1 to 3. Except for the arrangement of the slits, the embodiment in FIGURES 4 to 6 corresponds to the first embodiment.

Having now described my invention and in what manner the same may be used, what I claim as new and desire to protect by Letters Patent is:

1. A ferrule comprising a sleeve having a conically shaped bore and a tapered one piece wedge block for securing a rope in said bore, said wedge block having helical grooves in its outer surface to receive certain strands of the rope and having a central opening with helical grooves to receive certain other strands, said opening and last grooves being arranged so that the wedge block will screw onto said other strands in their original positions in the rope after said first mentioned strands have been spread apart from the rope, said wedge block being segmented by a plurality of longitudinal slits extending from one end of the wedge block, said slits extending inwardly from said outer surface of the wedge block to said central opening and following helical paths between said outer grooves.

2. A ferrule as defined in claim 1, said slits extending from the small end of the wedge block and said segments being connected together at the large end of the wedge block.

3. A ferrule comprising a sleeve having a conically shaped bore and a tapered one piece wedge block for securing a rope in said bore, said wedge block having helical grooves in its outer surface to receive certain strands of the rope and having a central opening with helical grooves to receive certain other strands, said opening and last grooves being arranged so that the wedge block will screw onto said other strands in their original poistions in the rope after said first mentioned strands have been spread apart from the rope, said wedge block being segmented by a plurality of longitudinal slits extending from one end of the wedge block, said slits extending from the large end of the wedge block and said segments being connected together at the small end of the wedge block.

4. A ferrule as defined in claim 3, said slits extending part way to said small end.

5. A ferrule as defined in claim 4, including a slit extending the entire length of the wedge block.

6. A ferrule comprising a sleeve having a conically shaped bore and a tapered one piece wedge block for securing a rope in said bore, said wedge block having helical grooves in its outer surface to receive certain strands of the rope and having a central opening with helical grooves to receive certain other strands, said opening and last grooves being arranged so that the wedge block will screw onto said other strands in their original positions in the rope after said first mentioned strands have been spread apart from the rope, said wedge block being segmented by a plurality of longitudinal slits extending from the small end of the wedge block, said segments being connected together at the large end of the wedge block by bowed bridging webs adapted to deform and allow said slits to close when the wedge block is forced into said sleeve.

7. A ferrule comprising a sleeve having a conically shaped bore and a one piece tapered wedge block for securing a rope in said bore, said wedge block having a longitudinal, helically grooved opening therethrough to receive certain strands of the rope and having helical grooves in its outer surface to receive other strands of the rope, a slit extending the length of the wedge block between two of said outer grooves, and slits extending from the large end of the wedge block approximately halfway to its small end between other of said outer grooves, all of said slits extending approximately radially from said opening to the outer surface of the wedge block.

8. A ferrule comprising a sleeve having a conically shaped bore and a one piece, tapered, self-swaging wedge block for securing a wire rope in said bore, said wedge block having a longitudinal, helically grooved therethrough to receive certain strands of the rope and having helical grooves in its outer surface to receive other strands of the rope, and longitudinal slits in said wedge block disposed between said outer grooves.

9. A ferrule for a rope having a number of strands twisted around a center strand, comprising a sleeve having a conically shaped bore therein, a tapered one piece wedge block for securing the rope in said bore, said wedge block having outer helical grooves arranged to clamp certain twisted strands of rope against said bore, inner helical grooves in said wedge block arranged to fit the remaining twisted strands in their original positions in the rope, inner surfaces in said wedge block arranged to engage and clamp said center strand, surfaces in said inner grooves arranged to engage and clamp said remaining twisted strands against said center strand, and said wedge block being segmented by a plurality of longitudinal slits disposed between said outer grooves.

10. A ferrule for a rope having a single layer of strands twisted around a center strand, comprising a sleeve having a conically shaped bore therein, a tapered one piece wedge block for securing the rope in said bore, said wedge block having outer helical grooves arranged to fit alternate ones of the twisted strands in their natural twisted positions when displaced radially from their original positions and clamp said alternate strands against said bore, inner helical grooves arranged to fit the remaining twisted strands in their original positions in the rope, inner surfaces in said wedge block arranged to engage and clamp said center strand in the spaces made vacant by said displaced strands, surfaces in said inner grooves arranged to engage and clamp said remaining twisted strands against said center strand, and said wedge block being segmented by a plurality of longitudinal slits disposed between said outer grooves.

References Cited by the Examiner

UNITED STATES PATENTS

| 985,915 | 3/1911 | Marchand | 24—126 |
| 1,818,571 | 8/1931 | Myers | 24—122.6 |
| 1,857,436 | 5/1932 | Cole. | |
| 1,863,021 | 6/1932 | Matthes | 24—122.6 X |
| 1,886,247 | 11/1932 | Cole | 24—122.6 X |

FOREIGN PATENTS

| 248,185 | 3/1926 | Great Britain. |

References Cited by the Applicant

UNITED STATES PATENTS

| 2,072,215 | 3/1937 | Robinson. |
| 2,157,227 | 5/1939 | Brickman. |
| 2,341,922 | 2/1944 | King et al. |
| 2,385,225 | 9/1945 | Nielsen. |
| 2,856,662 | 10/1958 | Clark et al. |
| 2,935,776 | 5/1960 | Clark et al. |
| 3,045,305 | 7/1962 | Anderson. |
| 3,123,879 | 3/1964 | Boduroff. |

FOREIGN PATENTS

| 165,577 | 8/1949 | Austria. |
| 185,089 | 7/1955 | Austria. |

WILLIAM FELDMAN, *Primary Examiner.*

BERNARD A. GELAK, *Examiner.*